US010858840B2

(12) United States Patent
Ji et al.

(10) Patent No.: US 10,858,840 B2
(45) Date of Patent: Dec. 8, 2020

(54) ELECTRIC BLINDS ROOF STRUCTURE OF CANOPY AND CANOPY

(71) Applicant: Zhejiang Yotrio Group Co., Ltd., Linhai (CN)

(72) Inventors: Kai Ji, Linhai (CN); Jianqiang Xie, Linhai (CN)

(73) Assignee: ZHEJIANG YOTRIO GROUP CO., LTD., Linhai (CN)

( * ) Notice: Subject to any disclaimer, the term of this patent is extended or adjusted under 35 U.S.C. 154(b) by 103 days.

(21) Appl. No.: 16/193,223

(22) Filed: Nov. 16, 2018

(65) Prior Publication Data

US 2019/0186149 A1 Jun. 20, 2019

(30) Foreign Application Priority Data

Dec. 20, 2017 (CN) .................... 2017 2 1796462 U

(51) Int. Cl.
  *E04F 10/10* (2006.01)
  *E06B 7/086* (2006.01)
  *E06B 9/40* (2006.01)
(52) U.S. Cl.
  CPC .............. *E04F 10/10* (2013.01); *E06B 7/086* (2013.01); *E06B 9/40* (2013.01)
(58) Field of Classification Search
  CPC .......... E04F 10/10; E04F 10/08; E04B 7/163; E06B 7/086; E06B 9/386
  See application file for complete search history.

(56) References Cited

U.S. PATENT DOCUMENTS

| 3,196,895 | A | * | 7/1965 | Lloyd | F24F 13/15 137/270 |
| 4,449,563 | A | * | 5/1984 | Toda | E06B 9/26 160/184 |
| 4,527,355 | A | * | 7/1985 | Numakami | E04F 10/10 49/275 |
| 4,926,599 | A | * | 5/1990 | Scholz | E04F 10/10 49/87.1 |
| 5,306,210 | A | * | 4/1994 | Smit | E04B 7/163 454/250 |
| 5,433,259 | A | * | 7/1995 | Faludy | B60P 3/343 136/245 |
| 5,669,179 | A | * | 9/1997 | Hanlon | E06B 7/086 49/64 |
| 5,732,507 | A | * | 3/1998 | Edwards | E04B 7/163 49/74.1 |

(Continued)

*Primary Examiner* — Justin B Rephann
(74) *Attorney, Agent, or Firm* — Schwegman Lundberg & Woessner, P.A.

(57) ABSTRACT

An electric blinds roof structure provided in this invention includes a top frame, and at least a group of blinds is installed at the top frame. Each group of blinds includes a plurality of slats, a linkage strip, and an electric control mechanism, each slat is rotatably installed at the top frame, and each slat is directly hinged to the linkage strip or hinged to the linkage strip through a fixing member fixed at the slat. The electric control mechanism is used to drive at least one linkage strip to move thus to control opening and closing of the slats. This invention can drive the linkage strip to move through the electric control mechanism, thereby controlling the opening and closing of slats corresponding to blinds, and operation is convenient and reliable compared to the operation mode of rolling a rolling rod in the prior art.

7 Claims, 7 Drawing Sheets

(56) References Cited

U.S. PATENT DOCUMENTS

| | | | | |
|---|---|---|---|---|
| 5,839,233 A * | 11/1998 | Smit | E04B 7/163 | 52/198 |
| 5,862,633 A * | 1/1999 | Van Ells | E03B 3/02 | 52/16 |
| 5,873,202 A * | 2/1999 | Parks | E04B 7/163 | 49/74.1 |
| 6,202,363 B1 * | 3/2001 | Chang | E04B 7/163 | 160/22 |
| 8,413,389 B2 * | 4/2013 | Frigerio | E04F 10/10 | 52/302.1 |
| 8,756,873 B1 * | 6/2014 | Hire | E04F 10/10 | 49/74.1 |
| 9,422,715 B1 * | 8/2016 | Selzer | E04F 10/08 | |
| 10,560,050 B2 * | 2/2020 | Raghunathan | B60R 16/0307 | |
| 2004/0148899 A1 * | 8/2004 | Pertile | E06B 7/086 | 52/581 |
| 2009/0031641 A1 * | 2/2009 | Grazioso | E04F 10/02 | 52/74 |
| 2010/0000165 A1 * | 1/2010 | Koller | F24S 20/67 | 52/173.3 |
| 2013/0192770 A1 * | 8/2013 | Murphy, Jr. | E04F 10/10 | 160/5 |
| 2013/0199736 A1 * | 8/2013 | Ro | E06B 7/086 | 160/7 |
| 2013/0291438 A1 * | 11/2013 | Selzer | E04B 7/163 | 49/82.1 |
| 2013/0306254 A1 * | 11/2013 | Cheou | E06B 7/086 | 160/176.1 P |
| 2014/0116497 A1 * | 5/2014 | Sanders | E06B 9/40 | 136/246 |
| 2014/0175240 A1 * | 6/2014 | Selzer | E04F 10/10 | 248/237 |
| 2016/0115688 A1 * | 4/2016 | Weaver | E06B 7/086 | 52/473 |
| 2016/0177575 A1 * | 6/2016 | Ivic | E04F 10/10 | 52/302.1 |
| 2017/0145689 A1 * | 5/2017 | Ivic | E06B 9/386 | |
| 2018/0320374 A1 * | 11/2018 | Castel | E03B 3/03 | |
| 2019/0323232 A1 * | 10/2019 | Mitchell | E04B 7/163 | |
| 2019/0338528 A1 * | 11/2019 | Torman | E04F 10/10 | |

* cited by examiner

ELECTRIC BLINDS ROOF STRUCTURE OF CANOPY AND CANOPY

CROSS-REFERENCE TO RELATED APPLICATIONS

This Non-provisional application claims priority under 35 U.S.C. § 119(a) on Chinese Patent Application No(s). 201721796462.4 on Dec. 20, 2017, the entire contents of which are hereby incorporated by reference.

BACKGROUND OF THE INVENTION

Field of the Invention

This invention relates to a technical field of leisure articles and, more particularly, to an electric blinds roof structure of a canopy and the canopy.

Description of the Related Art

At present, there are many kinds of canopies on the market. The canopies are divided into several kinds according to the type, size, material, and color, and different kinds of canopies are also used differently. However, most of roofs of the existing canopies are fixed. Although there are many kinds of materials, such as cloth, iron material, polycarbonate hollow sheet, etc., these can only achieve a fixed pattern of light shading or light transmitting, and a user. cannot adjust the light as want for better enjoying the sunshine and feeling the outdoor sky.

For the purpose of adjusting the light, a canopy in the prior art includes an adjustable window blinds roof that includes a plurality of linkage slats, and the linkage of each slat is driven by engagement of worm and gear. The above-mentioned driving structure is to manually rolling a rolling rod docked with a turbo so as to drive the slats to open and close, which is inconvenient to operate.

BRIEF SUMMARY OF THE INVENTION

Aiming at the above-mentioned problems, this invention provides an easy-to-operate electric blinds roof structure and a canopy.

The technical solution of this invention is as follows:

An electric blinds roof structure of a canopy includes a top frame, and at least a group of blinds is installed at the top frame. Each group of blinds includes a plurality of slats, a linkage strip, and an electric control mechanism, each slat is rotatably installed at the top frame, and each slat is directly hinged to the linkage strip or hinged to the linkage strip through a fixing member fixed at the slat. The electric control mechanism is used to drive at least one linkage strip to move thus to control opening and closing of the slats.

In actual use, when there are a plurality groups of blinds, different groups of blinds can share the electric control mechanism or do not share the electric control mechanism. When the electric control mechanism is not shared, the blinds in different areas can be controlled according to requirements. The opening and closing angles of different groups of blinds can be different.

This invention can drive the linkage strip to move through the electric control mechanism, thereby controlling the opening and closing of slats corresponding to blinds, and operation is convenient and reliable compared to the operation mode of rolling a rolling rod in the prior art.

In one embodiment of this invention, the electric control mechanism may include a linear actuator and a first connection member, one end of the first connection member may be hinged to a movable rod of the linear actuator, and the other end may be hinged to the linkage strip.

In one embodiment of this invention, the electric control mechanism may include a drive motor, a second connection member, and a third connection member. A first end of the second connection member may be fixed with an output shaft of the drive motor, a second end of the second connection member may be hinged to a first end of the third connection member, and a second end of the third connection member may be hinged to the linkage strip.

In one embodiment of this invention, a plurality groups of blinds may be installed at the top frame.

In one embodiment of this invention, the electric blinds roof structure of the canopy may further include a solar panel installed at the top frame, a controller electrically connected with the solar panel, and a battery electrically connected with the controller, and the controller may be electrically connected with the electric control mechanism.

In outdoors without alternating current, the canopy of this invention can charge the battery by disposing the solar panel, such that the battery can supply power to the electric control mechanism.

In one embodiment of this invention, slats may be hinged to linkage strips through fixing members fixed at the slats, first fixing members may be installed at one end of the slats, and second fixing members may be fixed at the other end of the slats. Both the first fixing members and the second fixing members may be installed at the top frame, each first fixing member may be hinged to the linkage strip, and each second fixing member may be hinged to the other linkage strip.

The slats are usually section steel, and the direct rotated cooperation between the section steel and the top frame is not easy to realize. By providing fixing members at both ends of the slats, the slats can be conveniently installed at the top frame.

In one embodiment of this invention, one side of the slat may have a first hook portion in a width direction, a middle portion of the slat may have an insertion portion in the width direction, and the first fixing member and the second fixing member may be identical in structure. One end of the first fixing member cooperating with the slat may have a second hook portion cooperating with the first hook portion and an inserting slot portion cooperating with the insertion portion.

When the first hook portion is connected with the second hook portion, the insertion portion is inserted into the inserting slot portion. In actual use, the surface of the outer wall at one side of the slot walls of the inserting slot portion is provided with a trigger portion, and the trigger portion is triggered to loosen the first hook portion disposed at the slat and the second hook portion disposed at the fixing member. The first hook portion and the second hook portion are separated thereby easily completing the disassembly of the slat.

In one embodiment of this invention, the first fixing member may further have a positioning slot, the positioning slot may be located between the second hook portion and the inserting slot portion, and the slat may further have a protrusion strip cooperating with the positioning slot.

The positioning slot cooperates with the protrusion strip, facilitating the positioning of the fixing members and the slates, which not only improves the assembly efficiency, but also improves the transmission effect of the fixing members and the slates.

In one embodiment of this invention, both the first fixing members and the second fixing members may be installed at ends of the slats. The first fixing member and the second fixing member may have limiting portions relative to an outer side end of the slat, a position of the limiting portion may correspond to a position of the second hook portion or a position of the inserting slot portion, and the limiting portions may be used for abutting against ends of the slat.

By providing the limiting portion at the outer side end, the positions of the fixing members can be limited, and the assembly precision and assembly efficiency can be improved.

This invention further provides a canopy, including the above-mentioned electric blinds roof structure. The canopy further includes a plurality of support rods, the top frame is installed at upper ends of the support rods, and the electric control mechanism is installed at the top frame or the support rods. An electric device is further installed at the support rods or the top frame, and the controller is electrically connected with the electric device.

The electric device can be at least one of a lamp and a speaker. The lamp can also be a festive lantern and can be other devices in actual use.

Beneficial effects of this invention are: this invention can drive the linkage strip to move through the electric control mechanism, thereby controlling the opening and closing of slats corresponding to blinds, and operation is convenient and reliable compared to the operation mode of rolling a rolling rod in the prior art.

FIGURE REFERENCE NUMBERS

1 skeleton; 2 blinds; 3 electric roller blind mechanism; 4 top frame; 5 support rod; 6 solar panel; 7 battery; 8 linear actuator; 9 slat; 10 first fixing member; 11 linkage strip; 12 first connection member; 13 lamp; 14 speaker; 15 guide rail; 16 cloth drooping piece; 17 second hook portion; 18 limiting portion; 19 positioning slot; 20 inserting slot portion; 21 trigger portion; 22 protrusion strip; 23 insertion portion; 24 first hook portion; 25 outer cover pipe; 26 concave mouth; 27 first end cover; 28 rotation wheel; 29 second end cover; 30 tail insertion; 31 roller blind cloth; 32 transmission pipe; 33 roller blind motor; and 34 second fixing member.

DETAILED DESCRIPTION OF THE INVENTION

This invention will be described in detail below in combination with the accompanying drawings.

Figure 1:
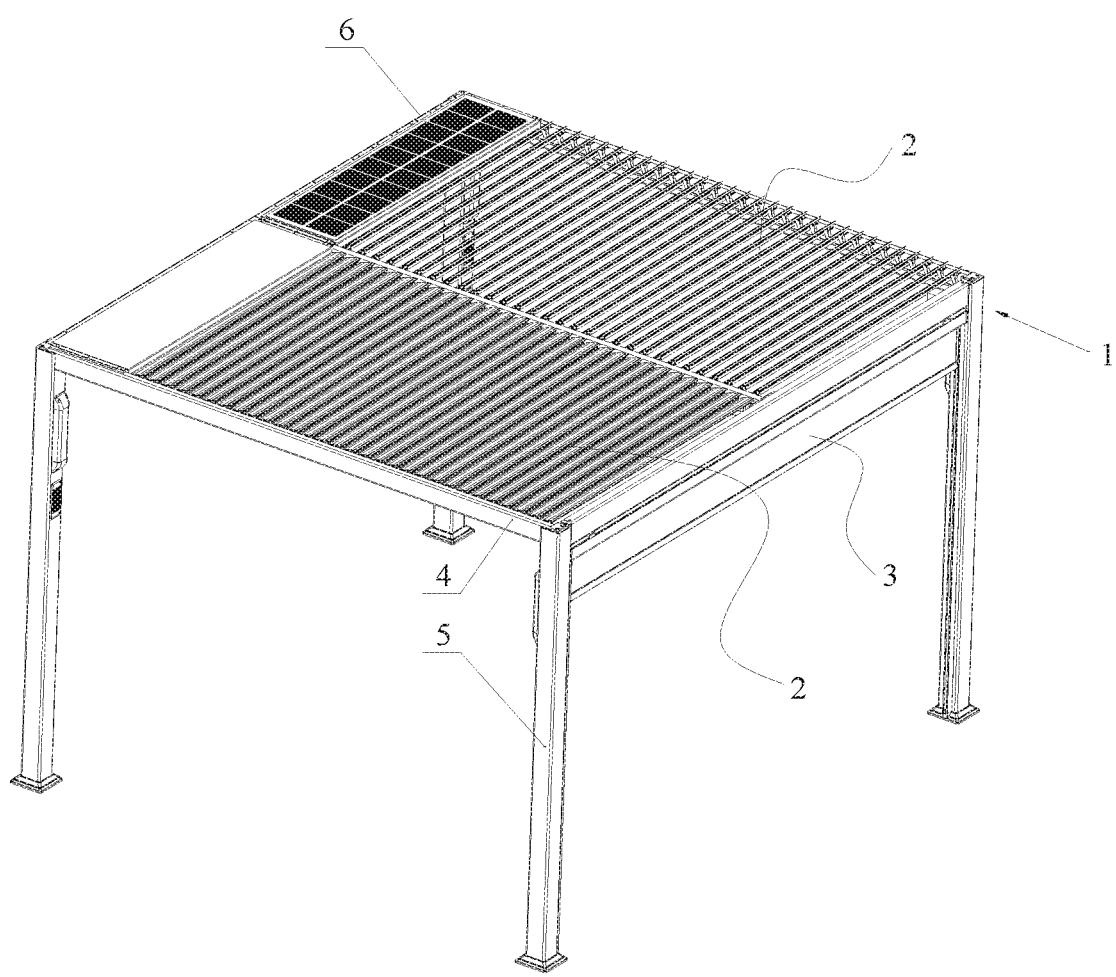
FIG. 1 is a structural schematic diagram of a canopy in this invention.
Figure 4:
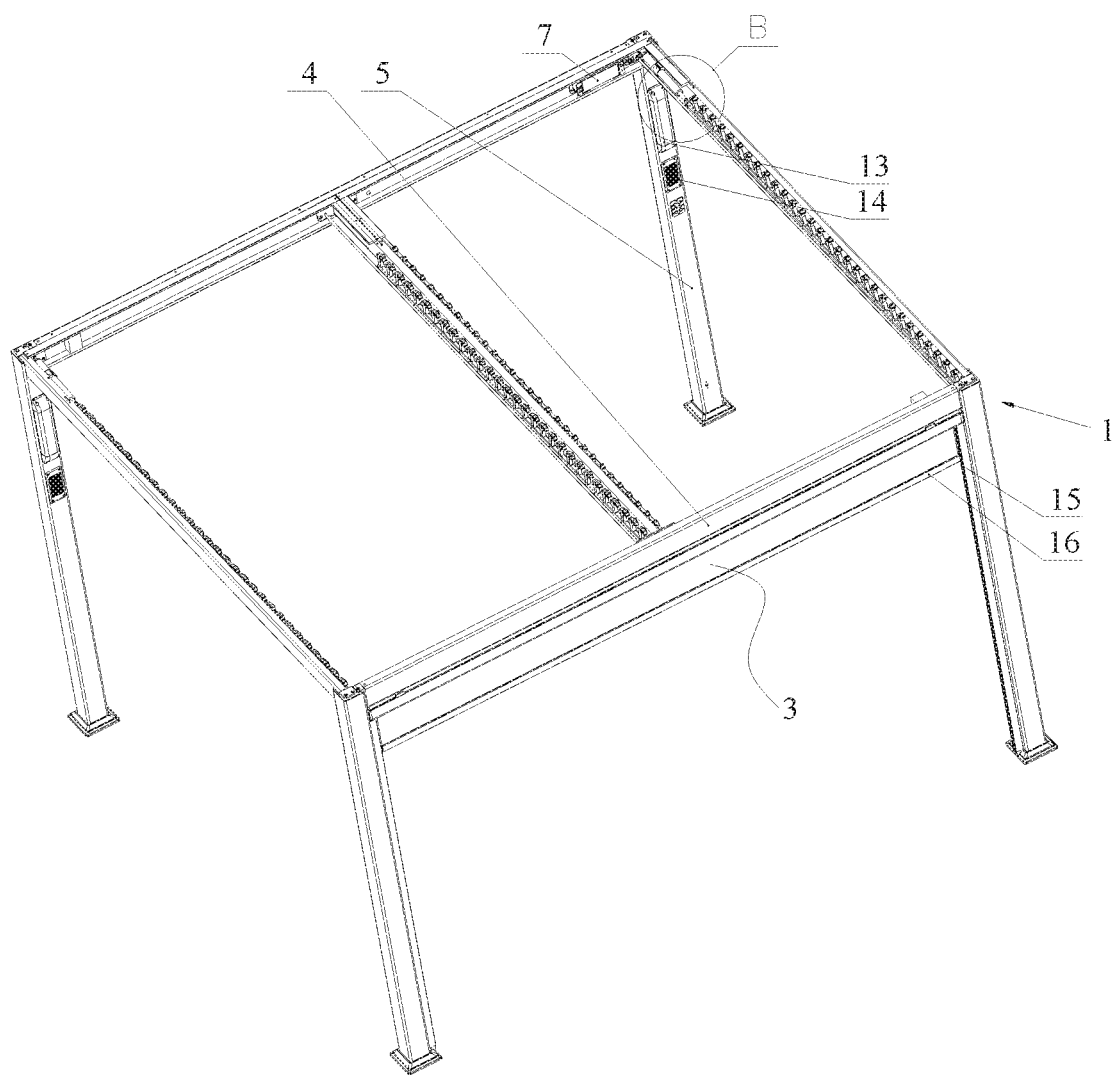
FIG. 4 is a schematic diagram of the canopy in this invention after slats are removed.

As shown in FIG. 1 and FIG. 4, a canopy includes a skeleton 1, and the skeleton 1 includes at least two support rods 5 parallel to each other. The canopy further includes at least one electric roller blind mechanism 3, and the electric roller blind mechanism 3 is disposed between two mutually parallel support rods 5. The electric roller blind mechanism 3 is disposed between two mutually parallel support rods 5 of the canopy, such that at least one side of the canopy can be opened or closed as needed, which is convenient compared to manual operation.

Figure 9:
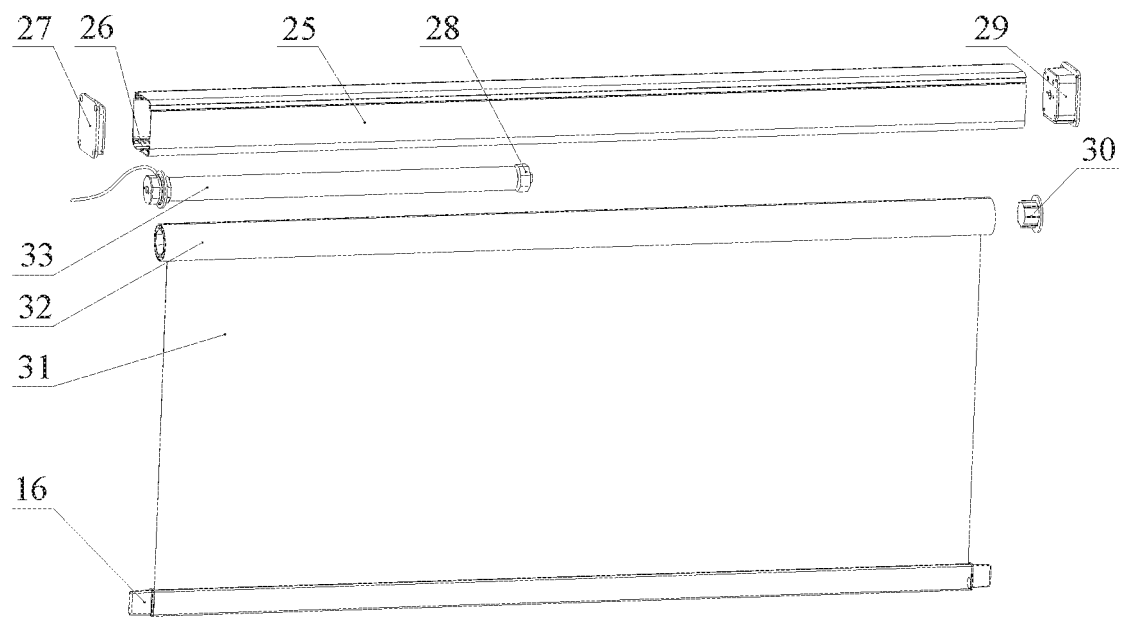
FIG. 9 is an exploded view of an electric roller blind mechanism.

As shown in FIG. 4 and FIG. 9, in this embodiment, two support rods 5 cooperating with the electric roller blind mechanism 3 have one guide rail 15, respectively, and the electric roller blind mechanism 3 includes:

an outer cover pipe 25, being fixed relative to the skeleton 1, and the lower end of the outer cover pipe 25 having a concave mouth 26;

a transmission pipe 32, disposed in the outer cover pipe 25;

a cloth drooping piece 16, two ends slidably cooperate with guide rails 15 of two support rods 5, respectively;

a roller blind cloth 31, one end being wound at the transmission pipe 32 and connected with the transmission pipe 32, and the other end being connected with the cloth drooping piece 16 through the concave mouth 26; and a roller blind motor 33, configured to drive the transmission pipe 32 to rotate and control the roller blind cloth 31 to move up and down.

The working principle of the electric roller blind mechanism 3 is: the roller blind motor 33 works, such that the transmission pipe 32 rotates in the outer cover pipe 25, thereby unwinding or rolling the roller blind. By disposing guide rails 15, the cloth drooping piece 16 only slides on the guide rails 15, and the cloth drooping piece 16 does not swing backwards and forwards due to wind blowing.

As shown in FIG. 9, one end of a body of the roller blind motor 33 is fixed relative to the outer cover pipe 25, and the other end reaches into the transmission pipe 32. An output shaft of the roller blind motor 33 is provided with a rotation wheel 28, the body of the roller blind motor 33 is in clearance fit with the transmission pipe 32, and the rotation wheel 28 is fixed relative to an inner side wall of the transmission pipe 32 in a circumferential direction. In this invention, the rotation wheel 28 being fixed relative to the inner side wall of the transmission pipe 32 in the circumferential direction refers that the inner side wall of the transmission pipe 32 is not round, and the rotation wheel 28 is adapted to the inner side wall of the transmission pipe 32 so as to achieve synchronous rotation.

As shown in FIG. 9, in this embodiment, the cross section of the inner side wall of the transmission pipe 32 is regular polygonal, and the cross section of an outer side wall of the rotation wheel 28 is adapted to the cross section of the inner side wall of the transmission pipe 32. The structure of the regular polygon is easy to process and stress is better during working.

As shown in FIG. 4, in this embodiment, the guide rails 15 are roller blind guide pipes fixed at the support rods 5. In actual use, the guide rails 15 are grooves disposed at the support rods 5.

As shown in FIG. 9, in this embodiment, the electric roller blind mechanism 3 further includes a tail insertion 30, a first end cover 27 and a second end cover 29 installed at two ends of the outer cover pipe 25. Both the first end cover 27 and the second end cover 29 are fixed relative to the outer cover pipe 25 in the circumferential direction. The first end cover 27 is fixed at the outer cover pipe 25, one end of the body of the roller blind motor 33 is fixed with the first end cover 27, the tail insertion 30 is installed at one end of the transmission pipe 32 away from the roller blind motor 33, and the tail insertion 30 cooperates with the second end cover 29. In actual use, the tail insertion 30 can be rotated in cooperation with the second end cover 29. Alternatively, the tail insertion 30 is fixed with the second end cover 29, and the tail insertion 30 is rotated in cooperation with the transmission pipe 32.

As shown in FIG. 4, in this embodiment, the skeleton 1 further includes a top frame installed at the upper end of the support rods 5, and the upper portion of the outer cover pipe 25 is fixed with the top frame 4.

As shown in FIG. 1, in this embodiment, the canopy further includes a solar panel 6 installed at the top frame 4, a controller electrically connected with the solar panel 6, and a battery 7 electrically connected with the controller. The controller is electrically connected with the roller blind motor 33.

In other embodiments, the electric roller blind mechanism can also be disposed at one side of the top frame (specifically, the top frame may include a top beam, and the electric roller blind mechanism may be disposed at one side of the top beam). At this time, the guide rails can be not disposed at the support rods, the upper ends of the guide rails are fixed with the top frame, and the two ends of the cloth drooping piece slidably cooperate with corresponding two guide rails at two sides, respectively. Preferably, at this time, the guide rails are roller blind guide pipes.

As shown in FIG. 1, FIG. 2, FIG. 3, FIG. 4 and FIG. 5, the canopy in this embodiment further includes an electric blinds roof structure, and the electric blinds roof structure includes the top frame 4. At least one group of blinds 2 is installed at the top frame 4, and each group of blinds 2 includes a plurality of slats 9, a linkage strip 11, and an electric control mechanism. Each slat 9 is rotatably installed at the top frame 4, each slat 9 is directly hinged to the linkage strip 11 or hinged to the linkage strip 11 through a fixing member fixed at the slat, and the electric control mechanism is used to drive at least one linkage strip 11 to move which controls opening and closing of the slats 9.

In actual use, when there are a plurality groups of blinds 2, different groups of blinds 2 can share the electric control mechanism or do not share the electric control mechanism. When the electric control mechanism is not shared, the blinds 2 in different areas can be controlled according to requirements. The opening and closing angles of different groups of blinds 2 can be different. This invention can drive the linkage strip 11 to move through the electric control mechanism, thereby controlling the opening and closing of slats 9 corresponding to blinds 2, and operation is convenient and reliable compared to the operation mode of rolling a rolling rod in the prior art.

Figure 3:
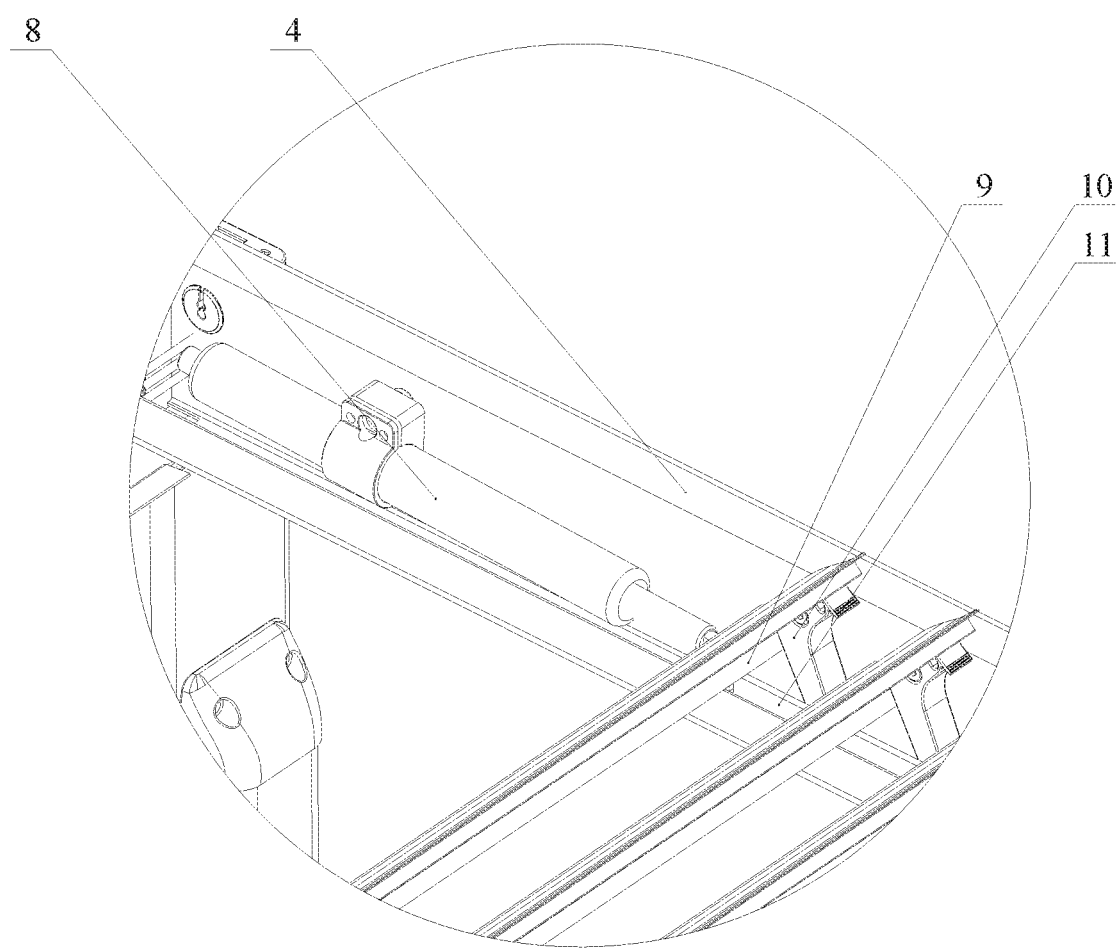
FIG. 3 is an enlarged view of A in FIG. 2.
Figure 5:
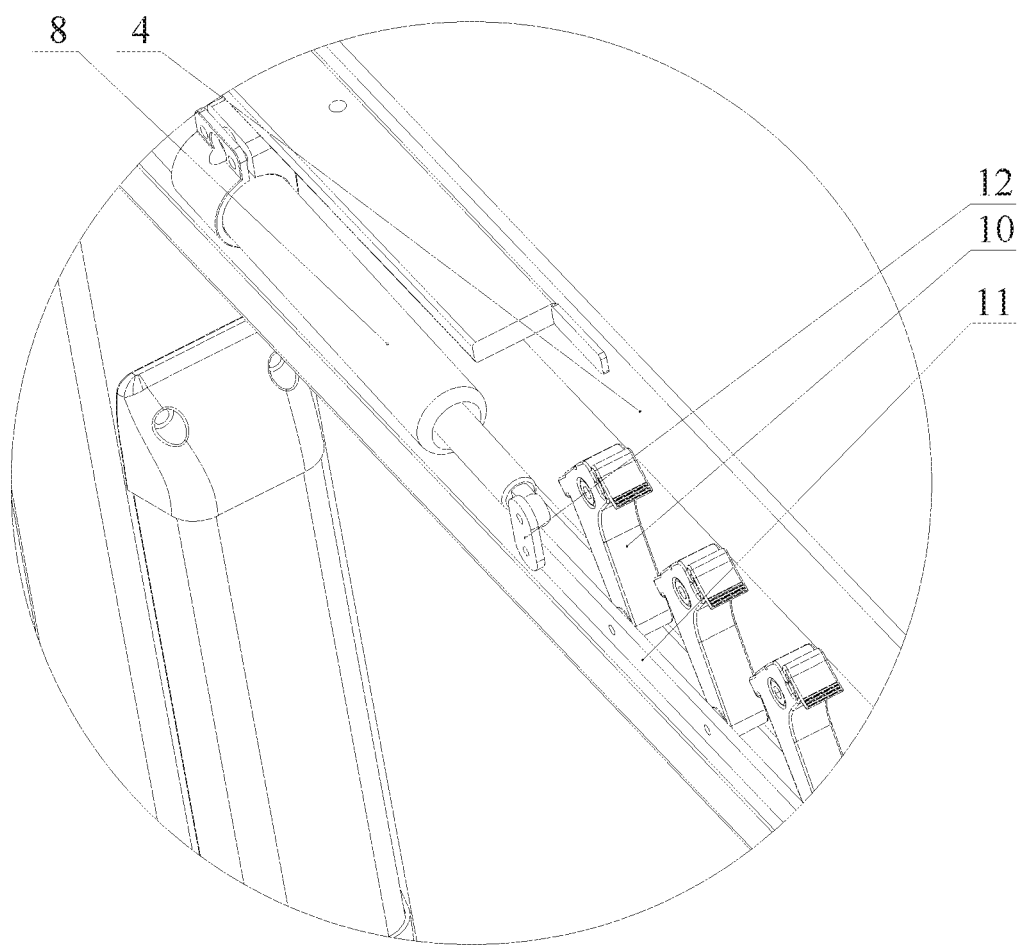
FIG. 5 is an enlarged view of B in FIG. 4.

As shown in FIG. 3 and FIG. 5, in this embodiment, the electric control mechanism includes a linear actuator 8 and a first connection member 12. One end of the first connection member 12 is hinged to a movable rod of the linear actuator 8, and the other end is hinged to the linkage strip 11. In actual use, the electric control mechanism may include a drive motor, a second connection member, and a third connection member. A first end of the second connection member is fixed with an output shaft of the drive motor, a second end of the second connection member is hinged to a first end of the third connection member, and a second end of the third connection member is hinged to the linkage strip 11.

As shown in FIG. 1, in this embodiment, two groups of blinds 2 are installed at the top frame 4, and more groups of blinds 2 can be installed in actual use.

Figure 2:
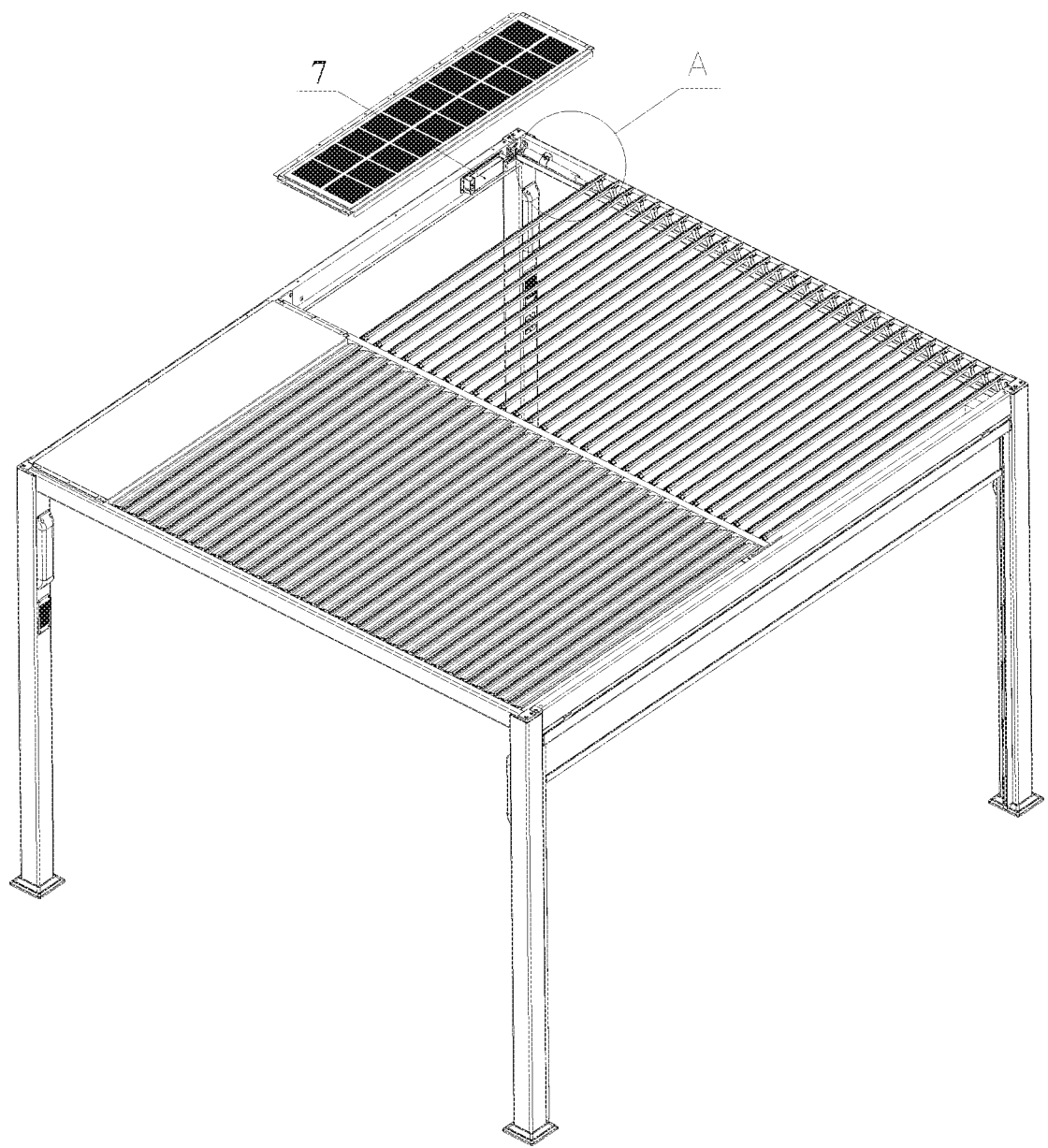
FIG. 2 is a schematic diagram of the canopy in this invention after explosion of a solar panel.

As shown in FIG. 1 and FIG. 2, in this embodiment, the canopy further includes the solar panel 6 installed at the top frame 4, the controller electrically connected with the solar panel 6, and the battery 7 electrically connected with the controller. The controller is electrically connected with the electric control mechanism. In outdoors without alternating current, the canopy of this invention can charge the battery 7 by disposing the solar panel 6, such that the battery 7 can supply power to the electric control mechanism.

Figure 7:
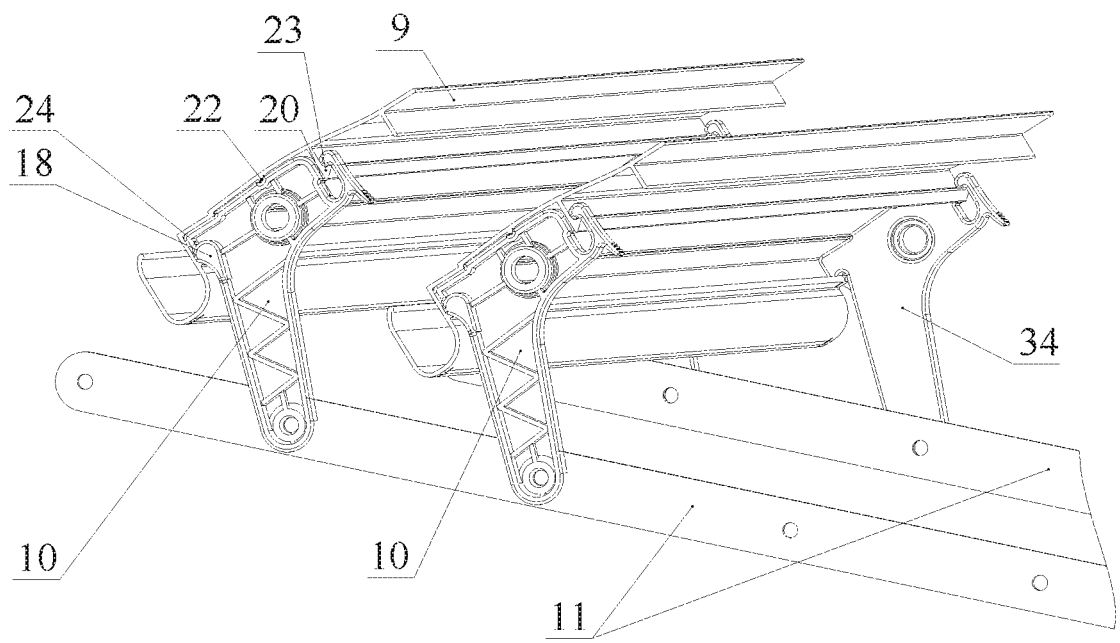
FIG. 7 is a schematic diagram of cooperation of slats, fixing members, and linkage strips.
Figure 8:
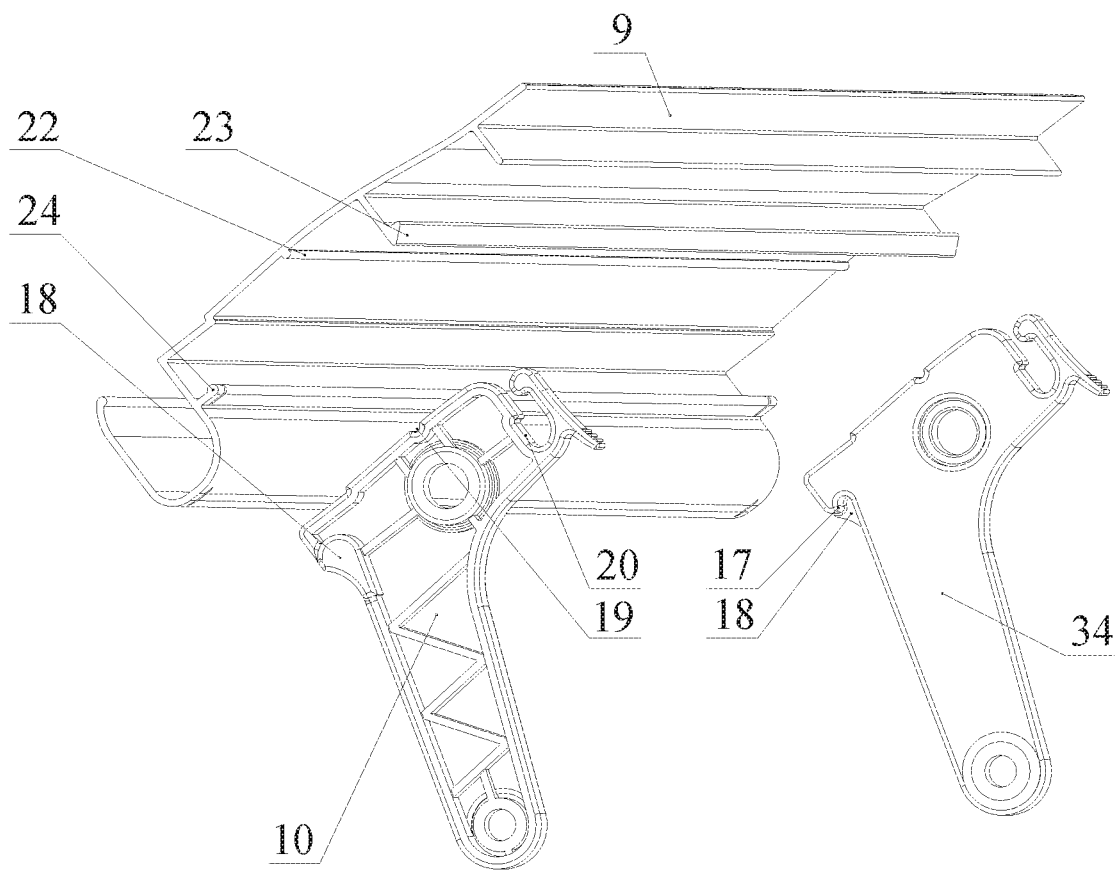
FIG. 8 is an exploded view of the slat and the fixing members.

As shown in FIG. 7 and FIG. 8, in this embodiment, slats 9 are hinged to linkage strips 11 through fixing members fixed with the slats 9. The first fixing members 10 are installed at one end of the slats 9, the second fixing members 34 are fixed at the other end of the slats 9, and both the first fixing members 10 and the second fixing members 34 are installed at the top frame. Each first fixing member 10 is hinged to the linkage strip 11, and each second fixing member 34 is hinged to the other linkage strip 11. The slats 9 are usually section steel, and the direct rotated cooperation between the section steel and the top frame 4 is not easy to realize. By providing fixing members at both ends of the slats 9, the slats 9 can be conveniently installed at the top frame 4.

Figure 6:
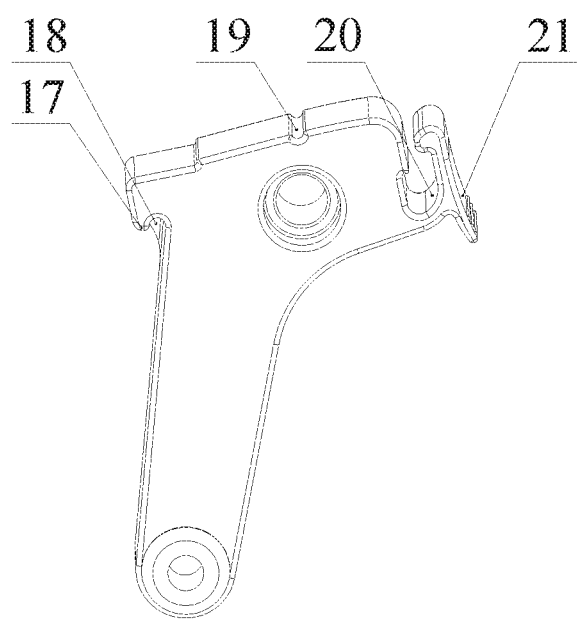
FIG. 6 is a structural schematic diagram of a first fixing member.

As shown in FIG. 6, FIG. 7, and FIG. 8, in this embodiment, one side of the slat 9 has a first hook portion 24 in a width direction, and a middle portion of the slat 9 has an insertion portion 23 in the width direction. The first fixing member 10 and the second fixing member 34 are identical in structure, and one end of the first fixing member 10 cooperating with the slat 9 has a second hook portion 17 cooperating with the first hook portion 2 and an inserting slot portion 20 cooperating with the insertion portion 23. When the first hook portion 24 is connected with the second hook portion 17, the insertion portion 23 is inserted into the inserting slot portion 20. In actual use, the surface of the outer wall of one of the slot walls of the inserting slot portion 20 is provided with a trigger portion 21, and the trigger portion 21 is triggered to loosen the first hook portion 24 disposed at the slat 9 and the second hook portion 17 disposed at the fixing member. The first hook portion 24 and the second hook portion 17 are separated thereby easily completing the disassembly of the slat 9.

As shown in FIG. 6, FIG. 7, and FIG. 8, in this embodiment, the first fixing member 10 further has a positioning slot 19, the positioning slot 19 is located between the second hook portion 17 and the inserting slot portion 20, and the slat further has a protrusion strip 22 cooperating with the positioning slot 19. The positioning slot 19 cooperates with the protrusion strip 22, facilitating the positioning of the fixing members and the slates 9, which not only improves the assembly efficiency, but also improves the transmission effect of the fixing members and the slates.

As shown in FIG. 6, FIG. 7, and FIG. 8, in this embodiment, both the first fixing members 10 and the second fixing members 34 are installed at ends of the slats 9. The first fixing member 10 and the second fixing member 34 have limiting portions 18 relative to the outer side end of the slat 9, the position of the limiting portion 18 corresponds to the position of the second hook portion 17 or the position of the inserting slot portion 20, and the limiting portions 18 are used for abutting against the end of the slat 9. By providing the limiting portion 18 at the outer side end, the positions of the fixing members can be limited, and the assembly precision and assembly efficiency can be improved.

In this embodiment, the electric control mechanism can be installed at the top frame 4. In actual use, the electric control mechanism can also be installed at the support rod 5. In this embodiment, an electrical device is also installed at the support rod 5 or the top frame 4, and the controller is electrically connected with the electrical device. The electric device can be at least one of a lamp 13 and a speaker 14. The lamp 13 can also be a festive lantern and can be other devices in actual use.

The above-mentioned is only a preferred embodiment of this invention and thus does not limit the protection scope of this invention. Any equivalent structural transformation made by using the description and the concanopies of the drawings of this invention directly or indirectly applied to other related technical field is equally included in the protection scope of this invention.

What is claimed is:

1. An electric blinds roof structure of a canopy, comprising a top frame, wherein at least a group of blinds is installed at the top frame; and each group of blinds comprises a plurality of slats, at least one linkage strip, and an electric control mechanism, each slat is rotatably installed at the top frame, each slat is directly hinged to one of the at least one linkage strip or hinged to one of the at least one linkage strip through a fixing member fixed at each slat, and the electric control mechanism is configured to drive one of the at least one linkage strip to move thus to control opening and closing of the slats;

wherein slats are hinged to linkage strips through fixing members fixed at the slats, first fixing members are installed at one end of the slats, second fixing members are fixed at a second end of the slats, both the first fixing members and the second fixing members are installed at the top frame, each first fixing member is hinged to one of the at least one linkage strip, and each second fixing member is hinged to a second of the least one linkage strip;

wherein one side of the slat has a first hook portion in a width direction, a middle portion of the slat has an insertion portion in the width direction, the first fixing member and the second fixing member are identical in structure, and one end of the first fixing member cooperating with the slat has a second hook portion cooperating with the first hook portion and an inserting slot portion cooperating with the insertion portion.

2. The electric blinds roof structure of the canopy according to claim 1, wherein the electric control mechanism comprises a linear actuator and a first connection member, one end of the first connection member is hinged to a movable rod of the linear actuator, and the other end of the first connection member is hinged to one of the at least one linkage strip.

3. The electric blinds roof structure of the canopy according to claim 1, wherein multiple groups of blinds are installed at the top frame and different groups of blinds are driven by different linkage strips.

4. The electric blinds roof structure of the canopy according to claim 1, wherein the electric blinds roof structure of the canopy further comprises a solar panel installed at the top frame, a controller electrically connected with the solar panel, and a battery electrically connected with the controller, and the controller is electrically connected with the electric control mechanism.

5. A canopy, comprising the electric blinds roof structure according to claim 4, wherein the canopy further comprises a plurality of support rods, the top frame is installed at upper ends of the support rods, the electric control mechanism is installed at the top frame or the support rods, an electric device is further installed at the support rods or the top frame, and the controller is electrically connected with the electric device.

6. The electric blinds roof structure of the canopy according to claim 1, wherein the first fixing member further has a positioning slot, the positioning slot is located between the second hook portion and the inserting slot portion, and the slat further has a protrusion strip cooperating with the positioning slot.

7. The electric blinds roof structure of the canopy according to claim 1, wherein both the first fixing members and the second fixing members are installed at ends of the slats, the first fixing member and the second fixing member have limiting portions relative to an outer side end of the slat, a position of the limiting portion corresponds to a position of the second hook portion or a position of the inserting slot portion, and the limiting portions are used for abutting against ends of the slat.

* * * * *